(12) United States Patent
Rashid et al.

(10) Patent No.: US 11,972,176 B2
(45) Date of Patent: Apr. 30, 2024

(54) PIPELINE NETWORK SOLVING USING DECOMPOSITION PROCEDURE

(71) Applicant: Schlumberger Technology Corporation, Sugar Land, TX (US)

(72) Inventors: Kashif Rashid, Cambridge, MA (US); Hamza Keurti, Beijing (CN); Rodney William Lessard, Menlo Park, CA (US); Trevor Graham Tonkin, Abingdon (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 571 days.

(21) Appl. No.: 17/309,217

(22) PCT Filed: Nov. 8, 2019

(86) PCT No.: PCT/US2019/060575
§ 371 (c)(1),
(2) Date: May 7, 2021

(87) PCT Pub. No.: WO2020/097534
PCT Pub. Date: May 14, 2020

(65) Prior Publication Data
US 2021/0397764 A1 Dec. 23, 2021

Related U.S. Application Data

(60) Provisional application No. 62/757,924, filed on Nov. 9, 2018.

(51) Int. Cl.
*G06F 30/18* (2020.01)
*F17D 3/01* (2006.01)
(Continued)

(52) U.S. Cl.
CPC ............... *G06F 30/18* (2020.01); *F17D 3/01* (2013.01); *H04L 12/4604* (2013.01); *G06F 3/0484* (2013.01); *G06F 2111/10* (2020.01)

(58) Field of Classification Search
CPC .... G06F 30/18; G06F 2111/10; G06F 3/0484; F17D 3/01; H04L 12/4604
See application file for complete search history.

(56) References Cited

U.S. PATENT DOCUMENTS 6,236,894 B1 5/2001 Stoisits et al.
2008/0154564 A1 6/2008 Rashid
(Continued)

FOREIGN PATENT DOCUMENTS

WO 2004003339 A1 1/2004
WO 2009114248 A2 9/2009

OTHER PUBLICATIONS

International Search Report and Written Opinion dated Apr. 6, 2020 for International Application No. PCT/US2019/060575.
(Continued)

*Primary Examiner* — Chuen-Meei Gan
(74) *Attorney, Agent, or Firm* — Jeffrey D. Frantz

(57) ABSTRACT

A physical pipeline network is decomposed into multiple subnetworks. The subnetworks include upstream subnetworks and at least one downstream subnetwork. A network solver is executed on the upstream subnetworks in parallel to obtain a set of boundary conditions and a set of control device settings. The set of boundary conditions and a set of control device settings are then used to execute the network solver on the downstream subnetwork and obtain a result having another set of control device settings. The network solver may repeat executions until convergence is achieved. When convergence is achieved, the result is presented.

16 Claims, 12 Drawing Sheets

(51) Int. Cl.
*H04L 12/46* (2006.01)
*G06F 3/0484* (2022.01)
*G06F 111/10* (2020.01)

(56) References Cited

U.S. PATENT DOCUMENTS

| | | |
|---|---|---|
| 2011/0119037 A1 | 5/2011 | Rashid et al. |
| 2012/0095603 A1 | 4/2012 | Rashid et al. |
| 2014/0207430 A1* | 7/2014 | Li .................. E21B 43/12 703/2 |
| 2014/0303949 A1* | 10/2014 | Boneti .................. G06Q 10/06 715/771 |
| 2014/0303951 A1* | 10/2014 | Houeto .................. E21B 43/00 703/10 |
| 2015/0261893 A1* | 9/2015 | Yu .................. G06F 30/13 703/1 |
| 2016/0209851 A1 | 7/2016 | Aughton et al. |
| 2016/0275217 A1 | 9/2016 | Boneti et al. |
| 2016/0356665 A1 | 12/2016 | Felemban et al. |
| 2017/0147010 A1 | 5/2017 | Aughton et al. |

OTHER PUBLICATIONS

Rashid, "A decomposition procedure for large-scale network simulation optimization," OFSR/RN/2016/145/Mathematical modeling/ C.
Keurti, "Decomposed Network Optimization" presentation.
Extended European Search Report in European Patent Application No. 19883167.9 dated Jul. 22, 2022, 5 pages.
International Preliminary Report on Patentability of International Patent Application No. PCT/US2019/060575 dated May 20, 2021, 6 pages.

* cited by examiner

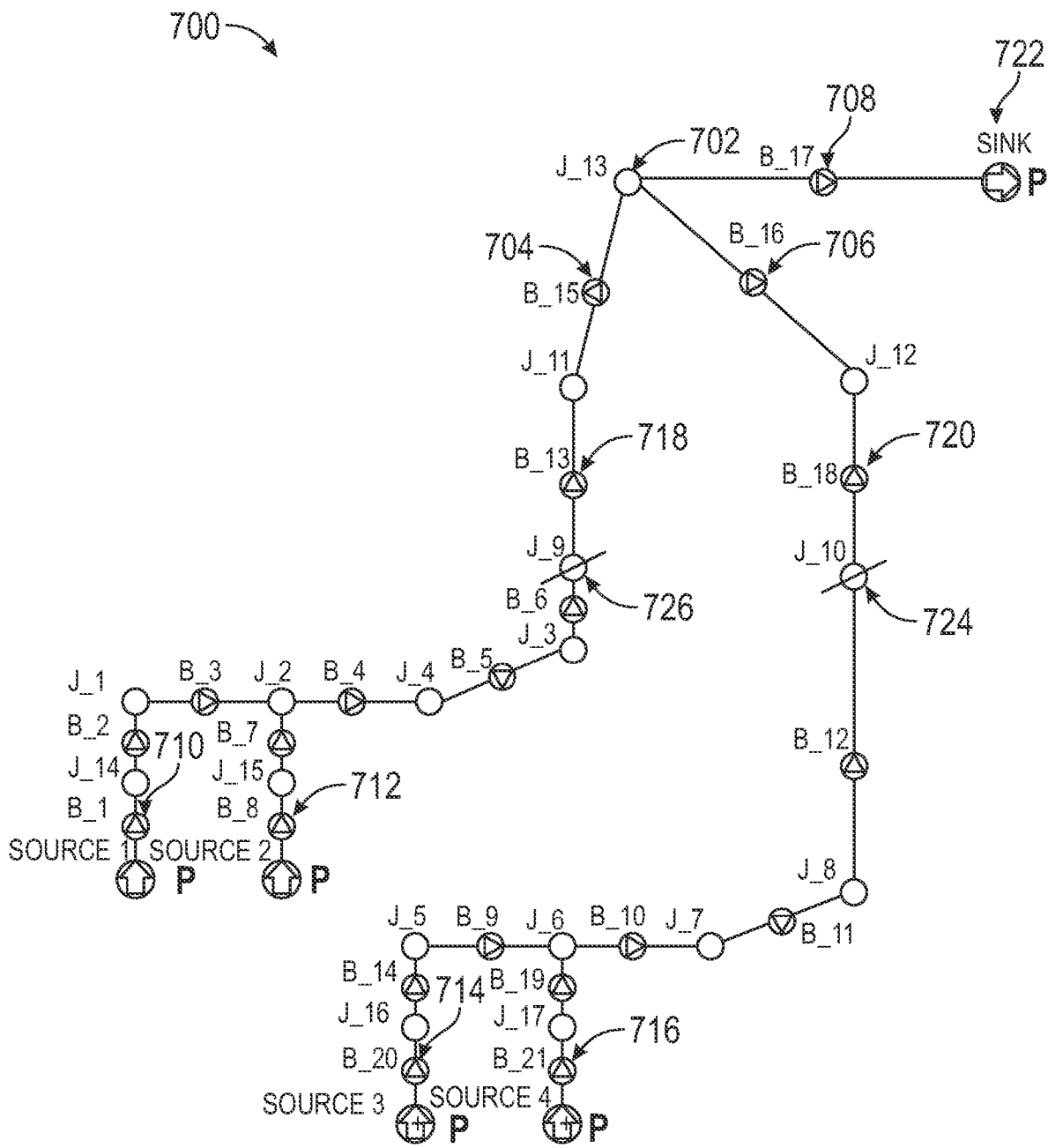
FIG. 7.1

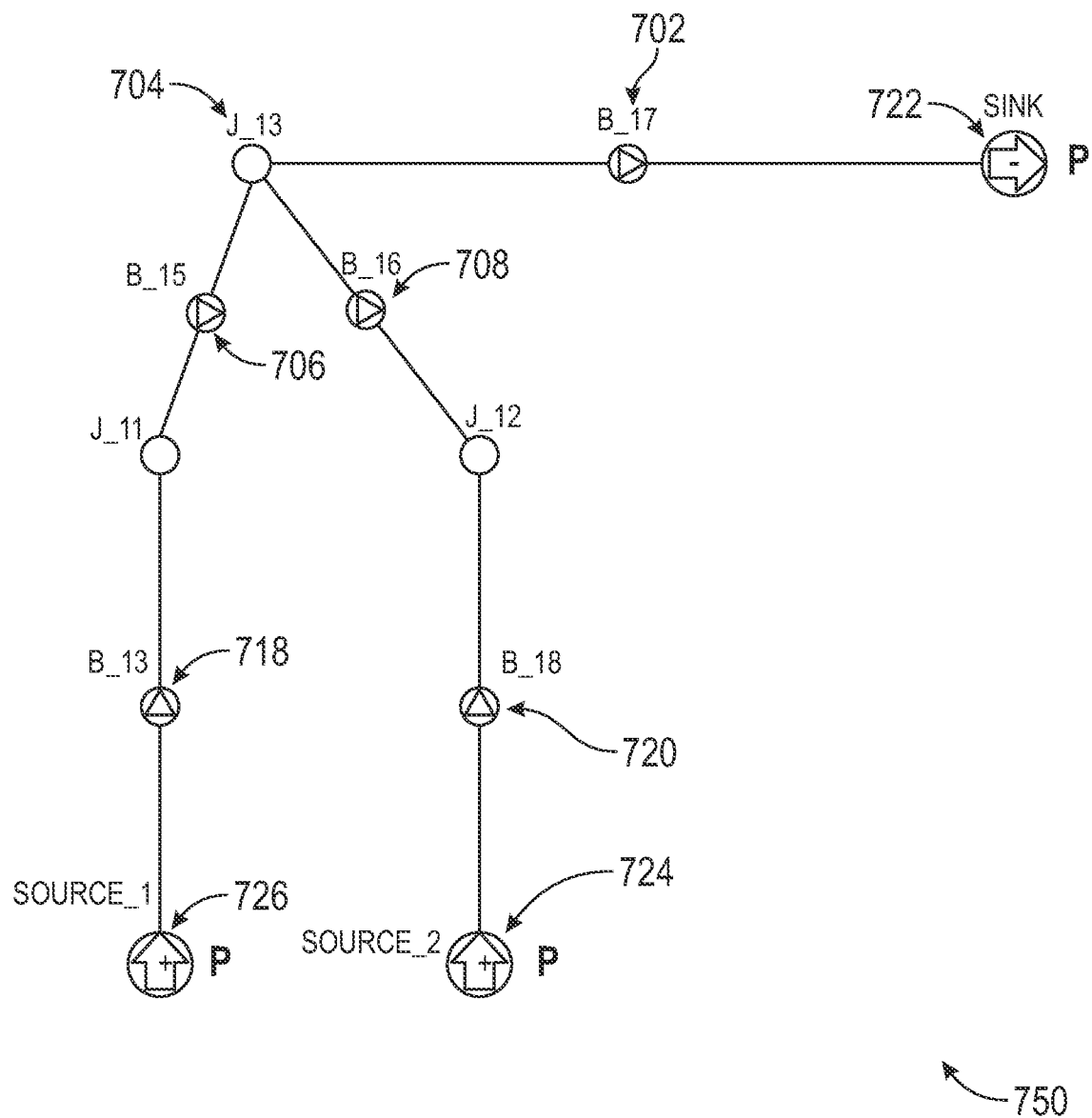
FIG. 7.2

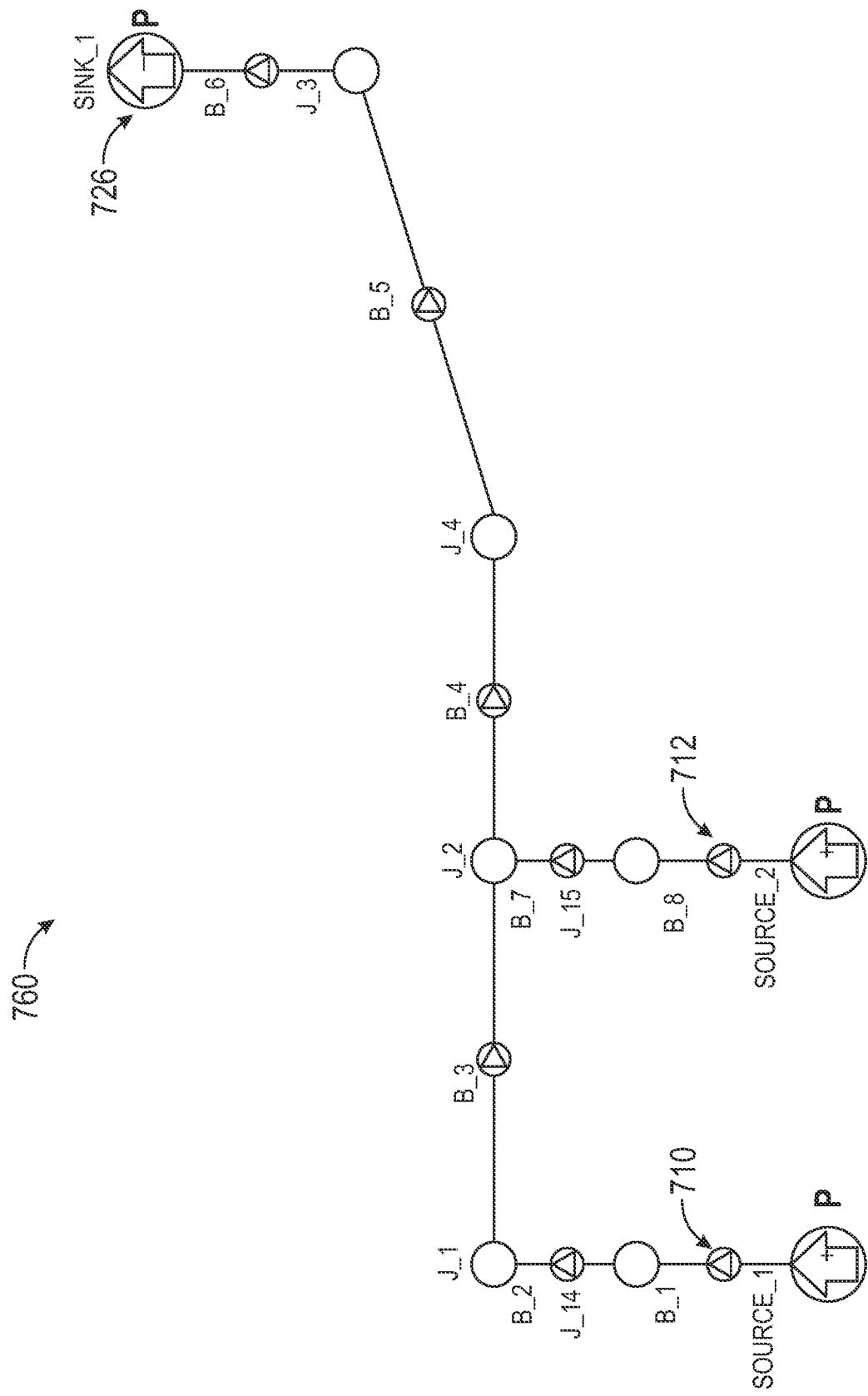
FIG. 7.3

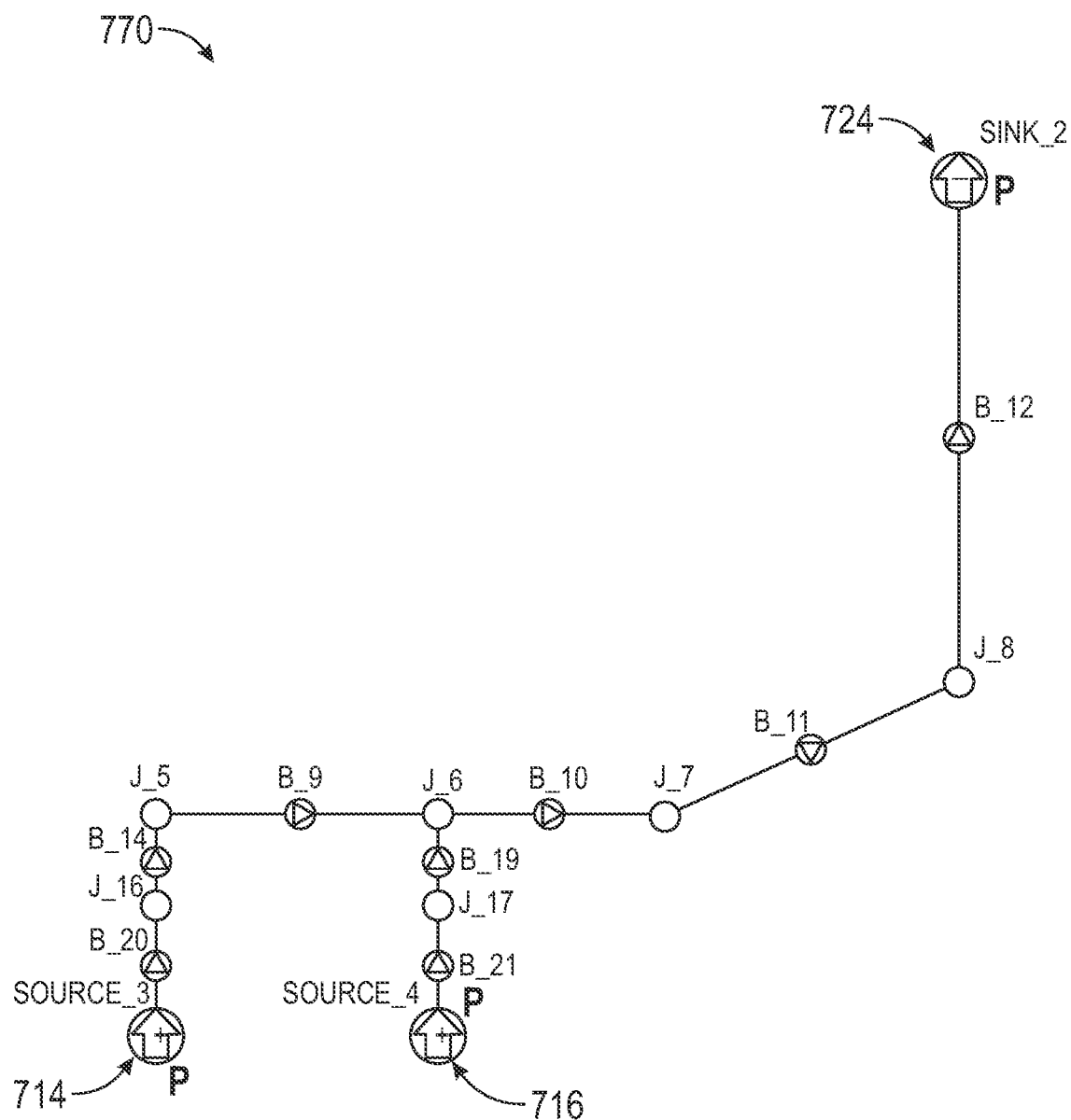
FIG. 7.4

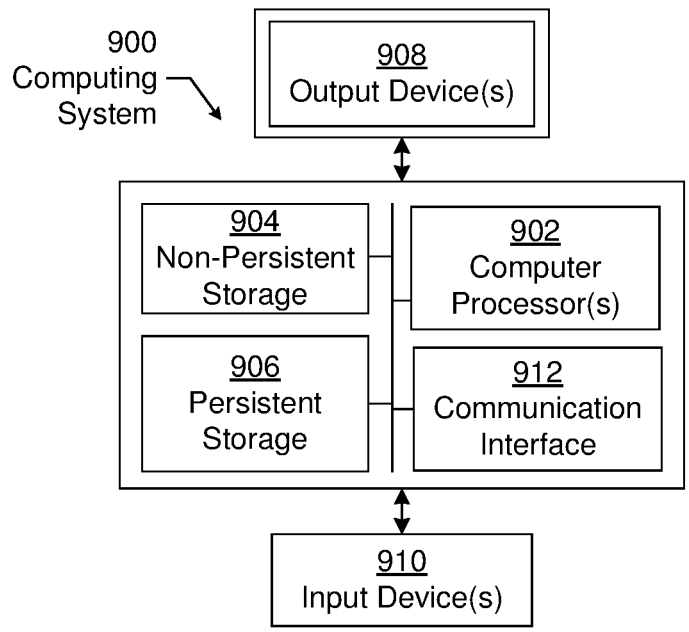
*FIG. 9.1*
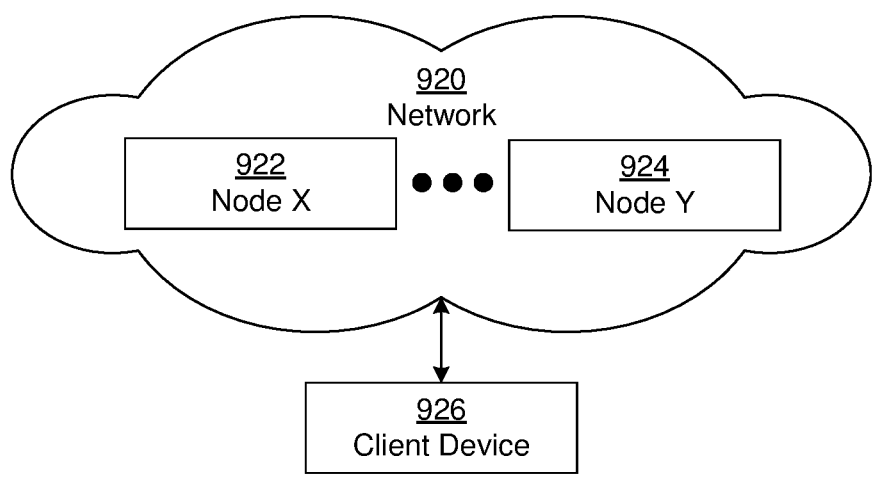
*FIG. 9.2*

PIPELINE NETWORK SOLVING USING DECOMPOSITION PROCEDURE

CROSS-REFERENCE TO RELATED APPLICATIONS

The present application is a National Stage Entry of International Patent Application No. PCT/US2019/060575, filed Nov. 8, 2019, which claims the benefit of U.S. Provisional Patent Application No. 62/757,924, entitled "PRODUCTION NETWORK OPTIMIZATION USING DECOMPOSITION PROCEDURE," filed on Nov. 9, 2018, and having the same inventors. U.S. Provisional Patent Application No. 62/757,924 is incorporated herein by reference in its entirety.

BACKGROUND

A pipeline network is a physical network of pipelines in which fluid may flow from one or more pipeline sources to one or more pipeline sinks. Pipeline networks may have multiple junctions in which two or more branches combine to have fluid flow to at least one other branches. The flow of fluid may be controlled using one or more control devices located within the pipeline network. The control devices, or selection thereof, may be configurable allowing for each control device to have a corresponding control device setting. Because of the connection, the fluid flow at different parts of the pipeline network may be affected by a particular control device setting of a particular control device. In other words, interconnection of the pipeline network creates an interrelationship between the various control device settings whereby upstream control device settings of upstream control devices have an effect on downstream control device settings of downstream control devices, and vice versa, as well as control device settings of control devices in disjoint branches may have an effect on each other. Because of the interconnection, a goal is to determine a set of control device settings that optimizes an objective function based on fluid flow through the pipeline network as defined by an optimization function. To determine such set of control device settings, a network solver may iterate through a search space performing a network simulation for each possible solution. For large networks having hundreds of control devices, the operations of the network solver may be infeasible to execute on a computing system. Thus, a need exists to create a computing system that can determine a set of control device settings such that the execution operates within the hardware and software constraints of the computing system.

SUMMARY

In general, in one aspect, one or more embodiments of the technology relate to a computing system obtaining a decomposed pipeline network that includes a pipeline network decomposed into subnetworks. The subnetworks include upstream subnetworks and at least one downstream subnetwork. The computing system individually executes, using a first set of control device settings and a first set of boundary conditions, a network solver on the upstream subnetworks in parallel to obtain a second set of boundary conditions and a second set of control device settings. The computing system further executes, using the second set of boundary conditions, the network solver on the downstream subnetwork to obtain a result that includes a third set of control device settings. When a threshold is satisfied, the third set of control device settings is presented based on the result.

Other aspects of the technology will be apparent from the following description and the appended claims.

BRIEF DESCRIPTION OF DRAWINGS

FIGS. 7.1, 7.2, 7.3, and 7.4 show an example in accordance with one or more embodiments of the technology.

FIGS. 9.1 and 9.2 show an example computing system in accordance with one or more embodiments of the technology.

DETAILED DESCRIPTION

Figure 1:
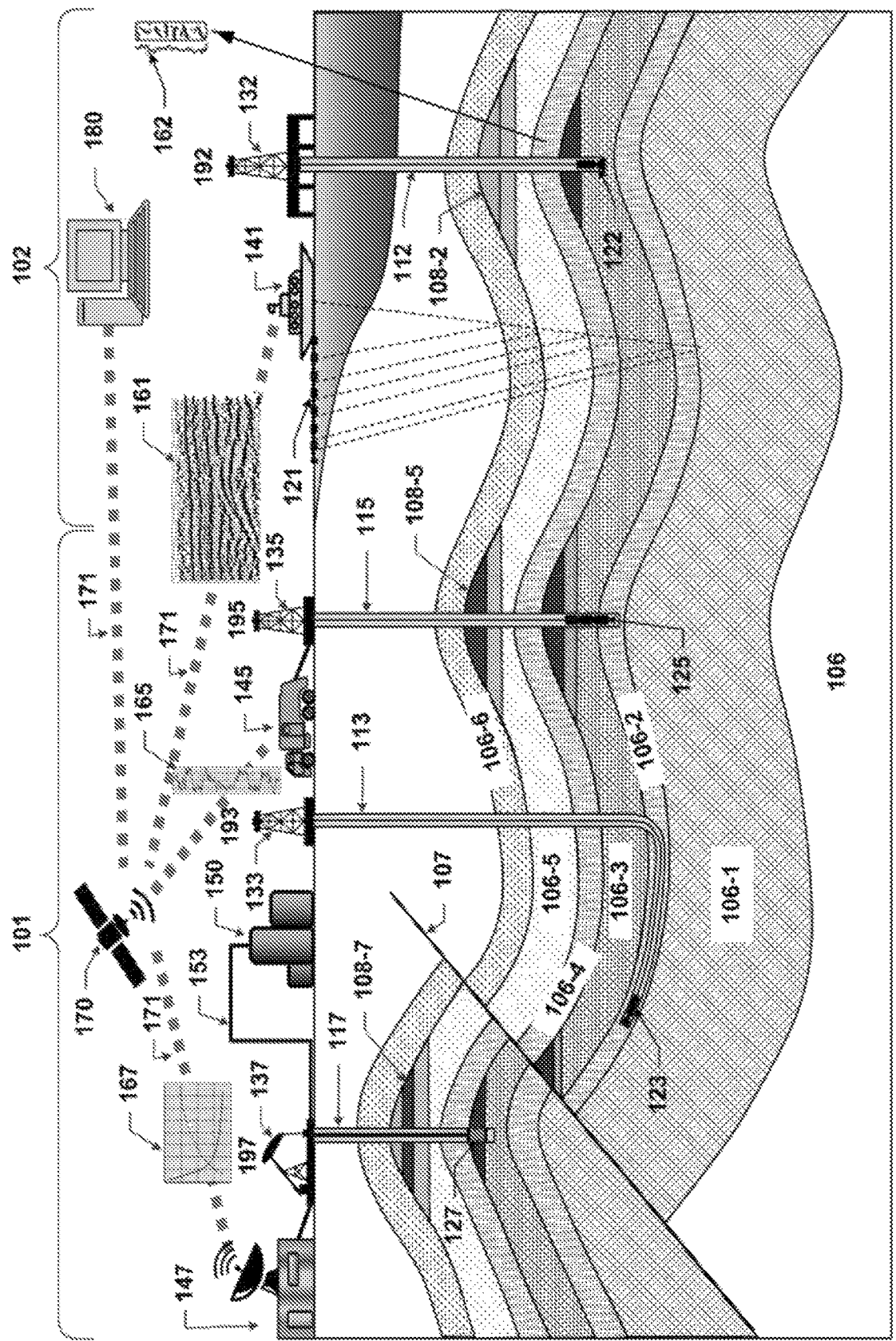
FIG. 1 shows a diagram of a field for which one or more embodiments may be implemented.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology relate to a computing system that can determine, for large pipeline networks, a set of control device settings such that the execution operates within the hardware and software constraints of the computing system. A pipeline network is a network of physical pipelines through which fluid may flow from one or more sources of the pipeline network to one or more sinks of the pipeline network. The pipeline network includes multiple junctions. A junction is a location in which three or more branches join. The pipeline network may also include various control devices that control the flow of fluid through the pipeline. The control devices are configurable and have multiple possible settings. The configurability of the control devices may be dynamic or static. Dynamic control devices may be configured with different control device settings over time. Static control devices do not change the control device setting once set. For example, during planning of the pipeline network, the specific control device is undefined. After executing the network solver using embodiments described herein, a particular type of control device having the control device setting from the network solver is selected as the static control device in the network.

To determine the set of control device settings, one or more embodiments decompose the pipeline network into subnetworks. The subnetworks do not overlap except at defined boundary nodes. At the defined boundary node, a sink of one subnetwork is the source of another subnetwork. Individual optimization operations are performed for the subnetworks to obtain a selected set of control device settings for the subnetwork and boundary conditions for the boundary nodes. The boundary conditions are resolved between subnetworks. By performing individual optimization operations for subnetworks, the execution may be performed in parallel. Thus, the computing system is created, through the software instructions, to optimize a large scale pipeline network that otherwise may not be executable on the computing system.

One or more embodiments may be applied to a variety of fluid flow networks, such as water, hydrocarbons, and other such networks. FIG. 1 depicts a schematic view, partially in cross section, of an onshore field (101) and an offshore field (102) for which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an exploration and production (E&P) computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) and processing facilities (not shown) through the pipeline network (153) (i.e., fluids transport pipeline). The pipeline network (153) includes the wellbore (112) and control devices within the wellbore (112) as well as the pipeline that connect the wellbore (112) to the surface storage tank (150) and to processing facilities (not shown). Although FIG. 1 shows a simplistic view of a pipeline, the pipeline network (153) may connect to tens to thousands of wells, which each have many control devices in the path to the sink.

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of exploration and production operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 9.1 and 9.2 and described below.

Returning to the pipeline network (153), the design of the pipeline network (153) considers many complex factors. Also, the operation has significant control capabilities through the various control device settings that may be optimized to achieve desired results. As such, the optimization procedure is complex and cannot be effectively accomplished directly by humans as human intuition cannot scale to the large numbers of controls present in modern production systems. Even for computers, optimization algorithms and heuristics can fail to derive the absolute best configuration of control settings possible due to the dimensionality space of the problem. The types of control device settings (i.e., controls) can vary from surface pump and compressor speeds, to wellhead choke bean sizes to downhole artificial lift injected gas rates, submersible pump speeds or rod pump stroke rates. For large producing fields, the number of controls can grow into the hundreds or thousands.

The inability to derive solutions in operational time spans can result in unoptimized operation of the production system and therefore, lost revenues streams in the millions. Alternatives are optimization at the individual well level which can only achieve suboptimal operation of the entire system due to the impact a single well has on the remainder of the system. At system design time, the production engineer is also interested in the optimum capability of a single design choice. An intractable or slow optimization procedure can result in over design and higher costs as the effective design search space will be limited by the time taken to optimize the operation of each. Production system optimization results in lower cost design alternatives and higher production operation. The value of embodiments disclosed herein is the extension of the optimization concept to much larger production systems and many more controls downstream of the wells.

Figure 2:
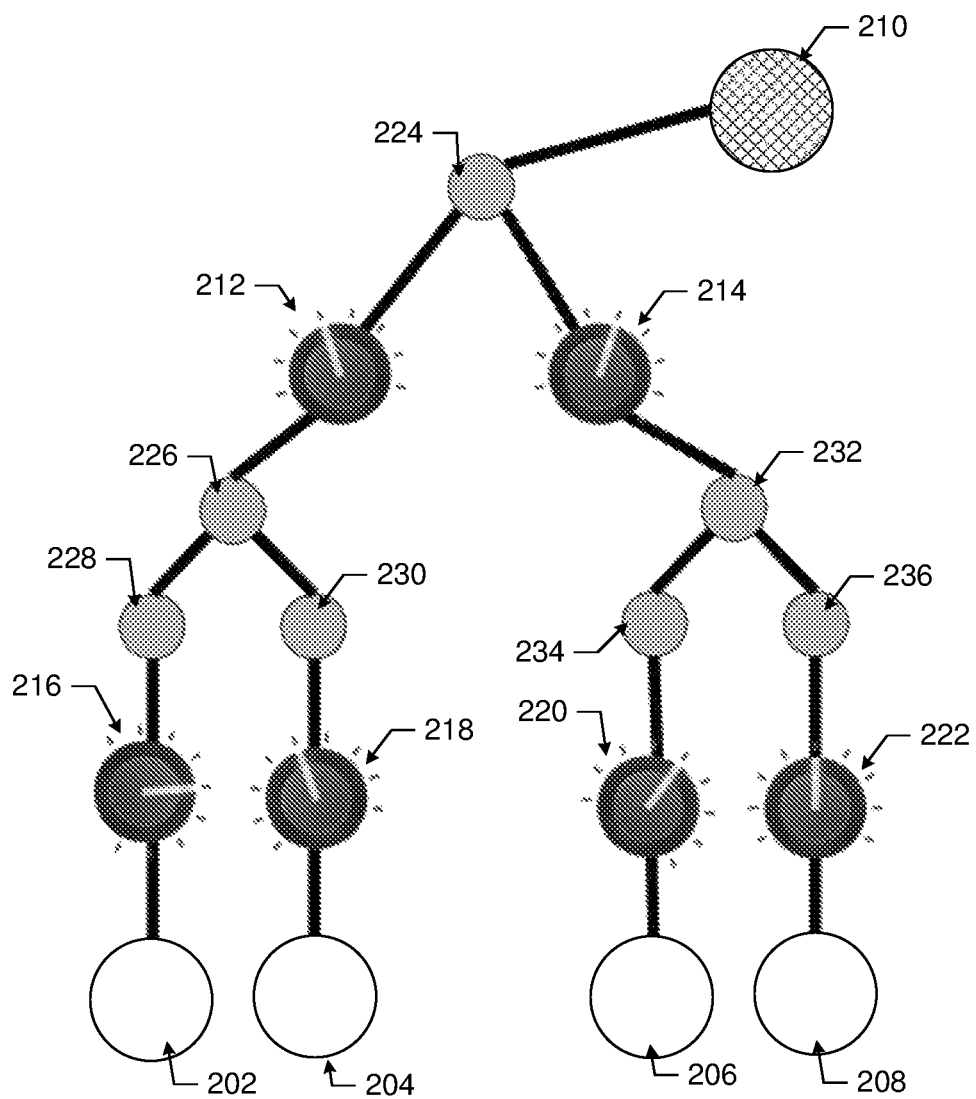
FIG. 2 shows an example network in accordance with one or more embodiments.
Figure 3:
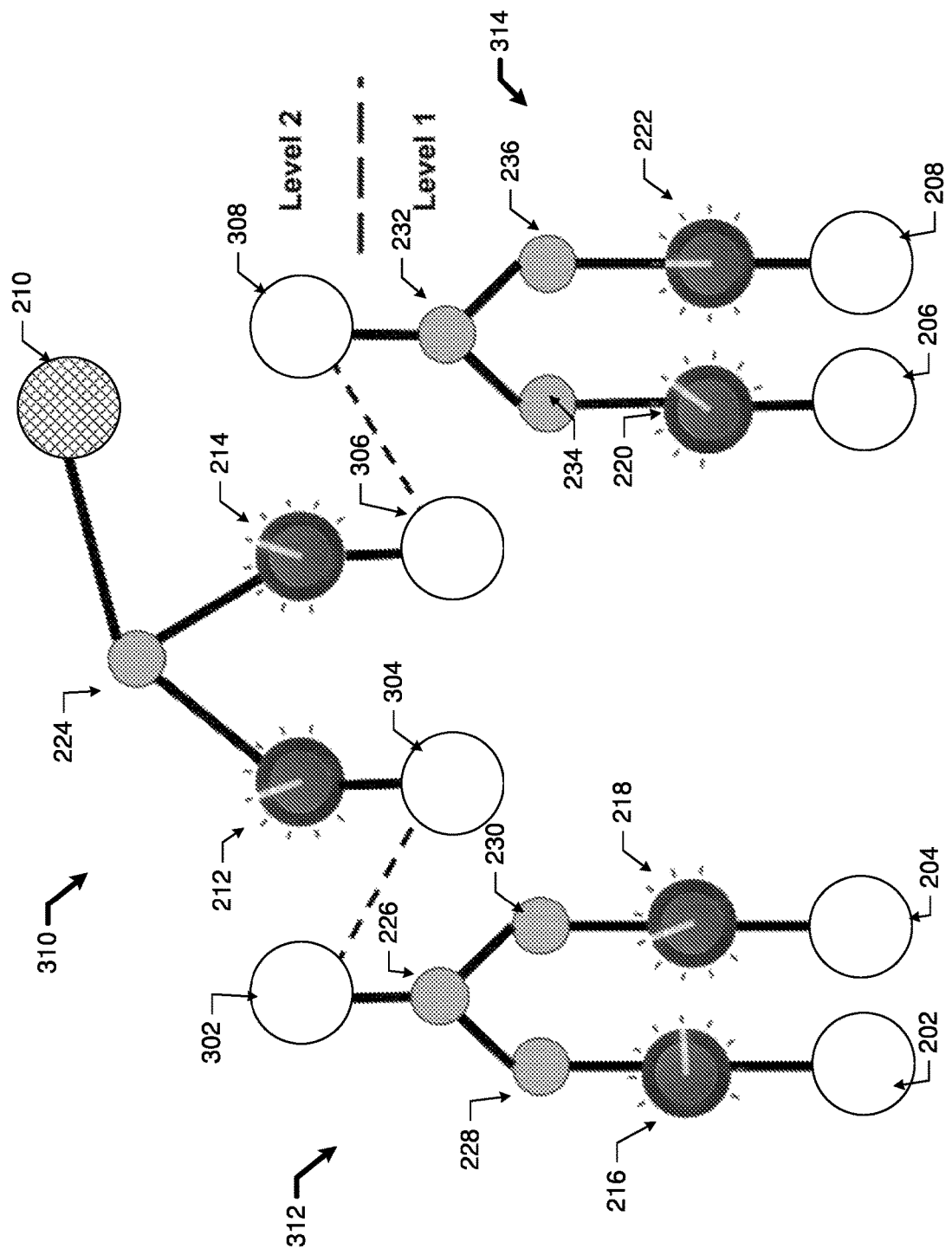
FIG. 3 shows a diagram of the example network of FIG. 2 decomposed into subnetworks in accordance with one or more embodiments.

FIGS. 2 and 3 show an example schematic diagram of an example pipeline network. For explanatory purposes, a reduced network having four fluid sources (202, 204, 206, 208), one sink (210), and six control devices (212, 214, 216, 218, 220, 222) is shown. For the purposes of the disclosure, each control device considered in the pipeline network for the optimization is configured to control or enhance the flow throughout the pipeline network based on a corresponding configurable setting. Thus, the control device is designed to have a specific impact on the downstream fluid momentum, energy or composition/transport properties which will, in the steady state, be transferred throughout the entire system. A goal is to determine the set of control device settings that optimizes a selected objective function (e.g., the rate of hydrocarbons transported, the cumulative quantity of hydrocarbons, the revenue from production, etc.).

Continuing with FIG. 2, the remaining grey circles (224, 226, 228, 230, 232, 234, 236) are junctions (224, 226, 232) and locations (228, 230, 234, 236) in which the pipeline connects to particular well sites. A junction is a location in the system where fluids may either combine or split into separate pipelines. In a gathering production system, a junction may combine fluids from two or more pipelines into at least one other pipeline. As another example, a junction may distribute fluids from at least one pipeline to two or more other pipelines. For example, a splitter node may break one input into two or more output branches. A branch is section of a production network that transports a single fluid from either a source or a junction to either another junction or sink. A branch may be comprised of multiple pipelines and or production equipment. The branches, shown in FIG. 2 as solid lines, have one or more branch nodes (not shown) along the branch that are candidate nodes for becoming boundary nodes. A candidate node is a candidate for becoming a boundary node. A boundary node is a location in the pipeline network that is in two subnetworks as shown in FIG. 3. Candidate nodes are between junctions (224, 226, 232) (e.g., along the branch above the junction) and not at control devices. In one or more embodiments, candidate nodes are along a branch so as to not have configurable settings or variable fluid flow caused by different subnetworks at the branch. In other words, because the candidate node, if selected is in two subnetworks, the candidate node should not itself have variable settings or be in three subnetworks.

FIG. 3 shows the pipeline network from FIG. 2 divided into subnetworks (310, 312, 314). Subnetworks include downstream subnetworks and upstream subnetworks. A downstream subnetwork is a subnetwork that is downstream from another subnetwork. An upstream subnetwork is a subnetwork that is upstream from another subnetwork. As such, fluid flows from an upstream subnetwork to a downstream subnetwork. A subnetwork may be an upstream subnetwork for one or more other subnetworks and a downstream subnetwork for one or more other subnetworks (e.g., as an intermediate subnetwork).

As shown in FIG. 3, the selected boundary nodes are along the branches between control device (212) and junction (226) and between control device (214) and junction (232). For example, the selected boundary nodes may be in the middle of the branch, near a junction, or at another location along the branch. The selected boundary nodes are converted into source and sink pairs. Specifically, the boundary node between control device (212) and junction (226) becomes a sink (302) for a first upstream subnetwork (312) and a source (304) for the downstream subnetwork (310). Similarly, the boundary node, between control device (214), and junction (232) becomes a sink (308) for a second upstream subnetwork (314) and a source (306) for the downstream subnetwork (310). Boundary conditions from an upstream subnetwork are recorded for the boundary nodes. The boundary conditions may include pressure, temperature, flow rates, fluid compositions, and/or other fluid properties.

Further, as shown in FIG. 3, subnetworks may be grouped into levels. A level of a particular subnetwork is the maximum number of subnetworks between a source of the entire pipeline network (e.g., an original source) and the particular subnetwork. Subnetworks on the same level may be executed in parallel in one or more embodiments. Specifically, at each level, the subnetworks are independent of each other and may be optimized in parallel using as many compute resources as are available. The optimization method used is described in the prior art details but may be considered a black box method whereby the subnetwork is simulated multiple times while varying the control settings and intelligently seeking the optimum result. The network simulation also executes in parallel with each individual flow path in the pipeline network being simulated by a different parallel process. Upon completion, updated fluid composition is passed on to the source boundary nodes at the next upstream level and the next level is optimized as above. The procedure continues until the subnetworks have been optimized at the various levels. For a large network, hundreds of computing processes work in parallel to simulate and optimize the entire system. Accordingly, one or more embodiments provide a technique to partition portions of the problem across a distributed computer system in order for the distributed computer system to be able to solve the production system optimization problem within the relevant time constraints. This is the main performance advantage of embodiments disclosed herein. In other words, a serial problem is transformed into one which may be executed by many parallel processes to significantly enhance performance.

Figure 4:
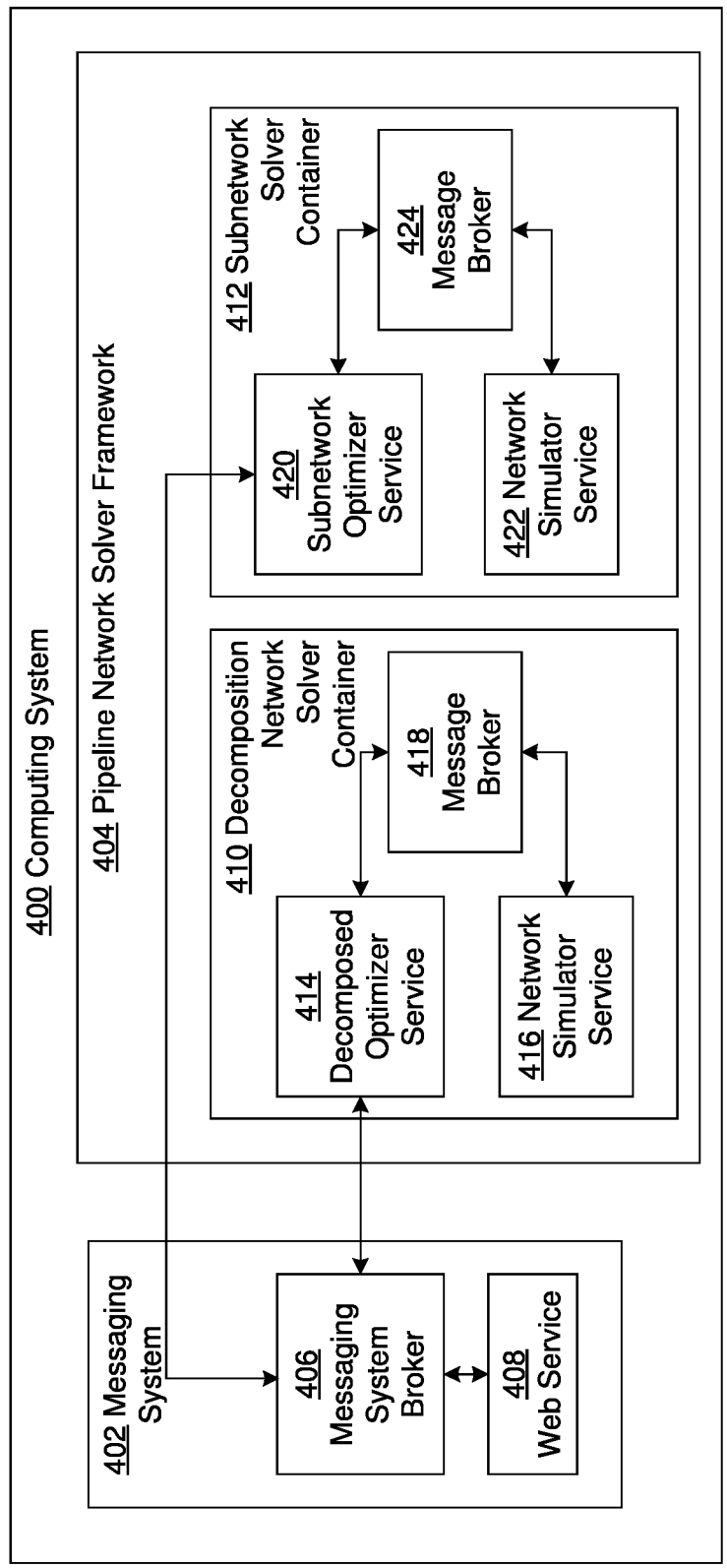
FIG. 4 shows a computing system for performing one or more embodiments of the technology.

FIG. 4 shows a computing system software architecture configured to perform one or more embodiments of the invention. The computing system (400) may be the E&P computing system described above in FIG. 1 or a different computing system. Further, the computing system (400) may be the computing system in FIGS. 9.1 and 9.2. As shown in FIG. 4, the computing system (400) includes a messaging system (402) and a pipeline network solver framework (404). The messaging system (402) includes a web service (408) and a messaging system broker (406). The web service (408) is a service configured to receive requests from one or more client devices (not shown) and expose the functionality of the pipeline network solver framework (404). The web service (408) may be configured to receive a pipeline specification or identification thereof, a set of parameters for executing the network solver. The pipeline specification includes the information about the pipeline, such as types and locations of control devices, the possible configuration settings of the control devices, layout of the pipeline, junction locations, and other information about the pipeline. The pipeline specification may be a network model or may be used to generate a network model of the pipeline network. The network model defines how fluid flows through the pipeline network.

The set of parameters for the executing the network solver are the user defined parameters for performing the optimization. For example, the parameters may include identification of the optimization function, the constants in the optimization function (e.g., price/barrel, relevant costs, etc.), weights, constraints, and other values to apply.

The web service (408) may include an application programming interface (API) and/or a graphical user interface (GUI) that exposes the functionality of the pipeline network solver framework (404). The GUI may have an interface for displaying an interactive image of a pipeline network through which commands may be received. For example, the interactive image may include functionality to display candidate nodes. Further, the GUI may include a GUI widget configured to trigger an event based on a user selection of a candidate node as a boundary node. Similar functionality may be exposed via the API.

The messaging system broker (406) and message brokers (418, 424) are software services configured to create and manage messaging queues. Services and clients push messages into the messaging queues for other services or client to pull messages from the queues. Thus, for example, the messaging system broker (406) manages messaging queues for client devices and between containers (410, 412). Messaging brokers (418, 424) within containers (410, 412) manage messaging queues for messaging between services within the container.

Continuing with FIG. 4, a pipeline network solver framework (404) is a software framework for defining a set of control device settings for a pipeline. The pipeline network solver framework (404) includes a decomposition network solver container (410) and multiple subnetwork solver containers (412). The various subnetwork solver containers may be the same or similar to the subnetwork solver container shown in FIG. 2.

A container (e.g., decomposition network solver container (410) and multiple subnetwork solver containers (412)) is a software container that provides a virtual environment for executing software. The container may be allocated a distinct set of hardware and/or software resources. Other virtual environments may be used without departing from the scope described herein.

A decomposition network solver container (410) includes functionality to execute a network solver for the entire pipeline network. Specifically, the decomposition network solver container (410) includes functionality to orchestrate the execution of the network solvers on the subnetworks, perform network simulations for the pipeline network as a whole, evaluate an objective function, and test for convergence. The decomposition network solver container (410) may further include a preprocessor with functionality to decompose the pipeline network into subnetworks. The decomposition network solver container (410) includes a decomposed optimizer service (414) and one or more network simulator services (416). The combination of the decomposed optimizer service (414) and the one or more network simulator services (416) form a network solver for the decomposition network solver container (410). A network simulator service (416) is a pipeline simulator that given a set of control device settings as input, is configured to use the network model of the pipeline network to determine the fluid flow through the pipeline network. The network simulator service (416) is configured to output simulation results having pressure drop, temperature, and fluid properties at the various locations of the pipeline network.

The decomposed optimizer service (414) is configured to iterate through a search space given a set of constraints and determine an optimal set of control device settings. A solution in the search space is a set of control device settings. For the various solutions, the decomposed optimizer service (414) is configured to issue a request to the network simulator service (416) to obtain the various simulation results. The decomposed optimizer service (414) is further configured to evaluate the simulation results using an objective function to determine whether the solution provided is optimal. Thus, executing a network solver is a repetitive two stage processes of selecting a set of control device settings, executing the network simulator service with the set of control device settings, then evaluating the output of the set of control device settings, and repeating the process for another set of control device settings.

Continuing with FIG. 4, the decomposition optimizer service (414) as an orchestrator triggers the parallel execution of subnetwork solver containers (412). The subnetwork solver containers (412) includes a subnetwork optimizer service (420) and a network simulator service (422). The subnetwork optimizer service (420) and the network simulator services (422) form a network solver for a subnetwork. Specifically, given a set of boundary conditions (e.g., the various fluid property values at the source of the subnetwork) and a network model for the assigned subnetwork, the network solver for the subnetwork is configured to output an optimal set of control device settings for the subnetwork. The network simulator service (422) may operate in a same or similar manner as the network simulator service (416) in the decomposition network solver container (410). The subnetwork optimizer service (420) includes similar functionality as the decomposed optimizer service (414) without the orchestrator. Specifically, the subnetwork optimizer service (420) includes functionality to execute an optimization problem having an objective function and constraints by issuing calls to the network simulator service and evaluating simulation results. In one or more embodiments, the optimization problem may be the same for the decomposed optimizer service (414) and the subnetwork optimizer service (420). The difference is that the decomposed optimizer service (414) operates on the full pipeline network while the subnetwork optimizer service (420) operates on the subnetwork.

As described above, one or more embodiments may achieve two levels of parallelization. A first level of parallelization is at the subnetwork optimization level in which multiple subnetworks have, in parallel, a determination of a set of optimal control device settings for the subnetwork given a set of boundary conditions. A second level of parallelization is at the network simulator service level. At the network simulator service level, within a particular container, multiple processes may simulate the pipeline network or subnetwork concurrently for a particular set of control device settings. Further, at the network simulator service level, one network simulator service may simulate the pipeline network for a first set of possible control device settings while another network simulator service simulates the pipeline network for a second set of possible control device settings.

While FIGS. 1-4 shows a configuration of components, other configurations may be used without departing from the scope of the technology. For example, various components may be combined to create a single component. As another example, the functionality performed by a single component may be performed by two or more components.

Figure 5:
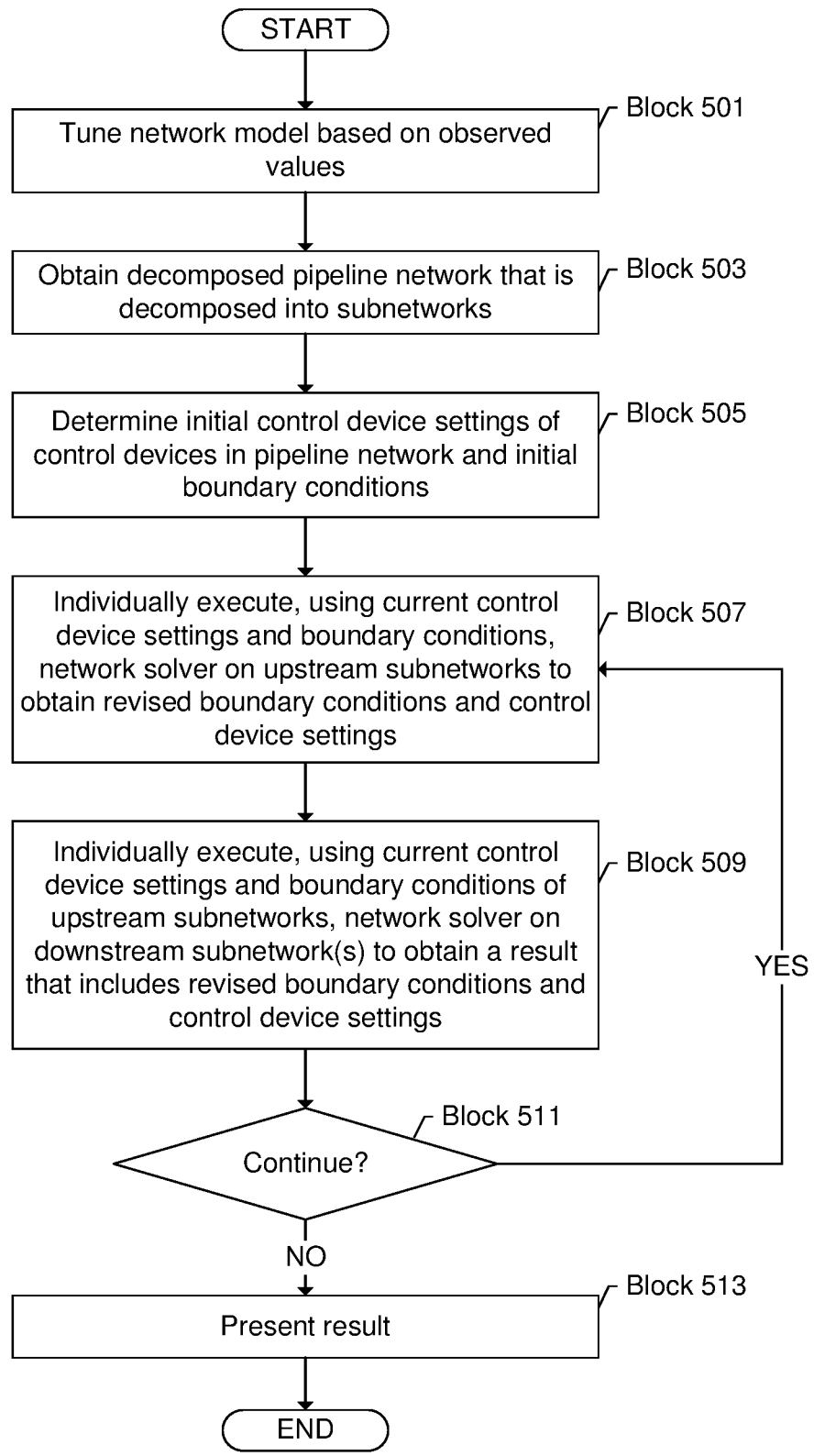
FIG. 5 shows a flowchart in accordance with one or more embodiments of the technology.
Figure 6:
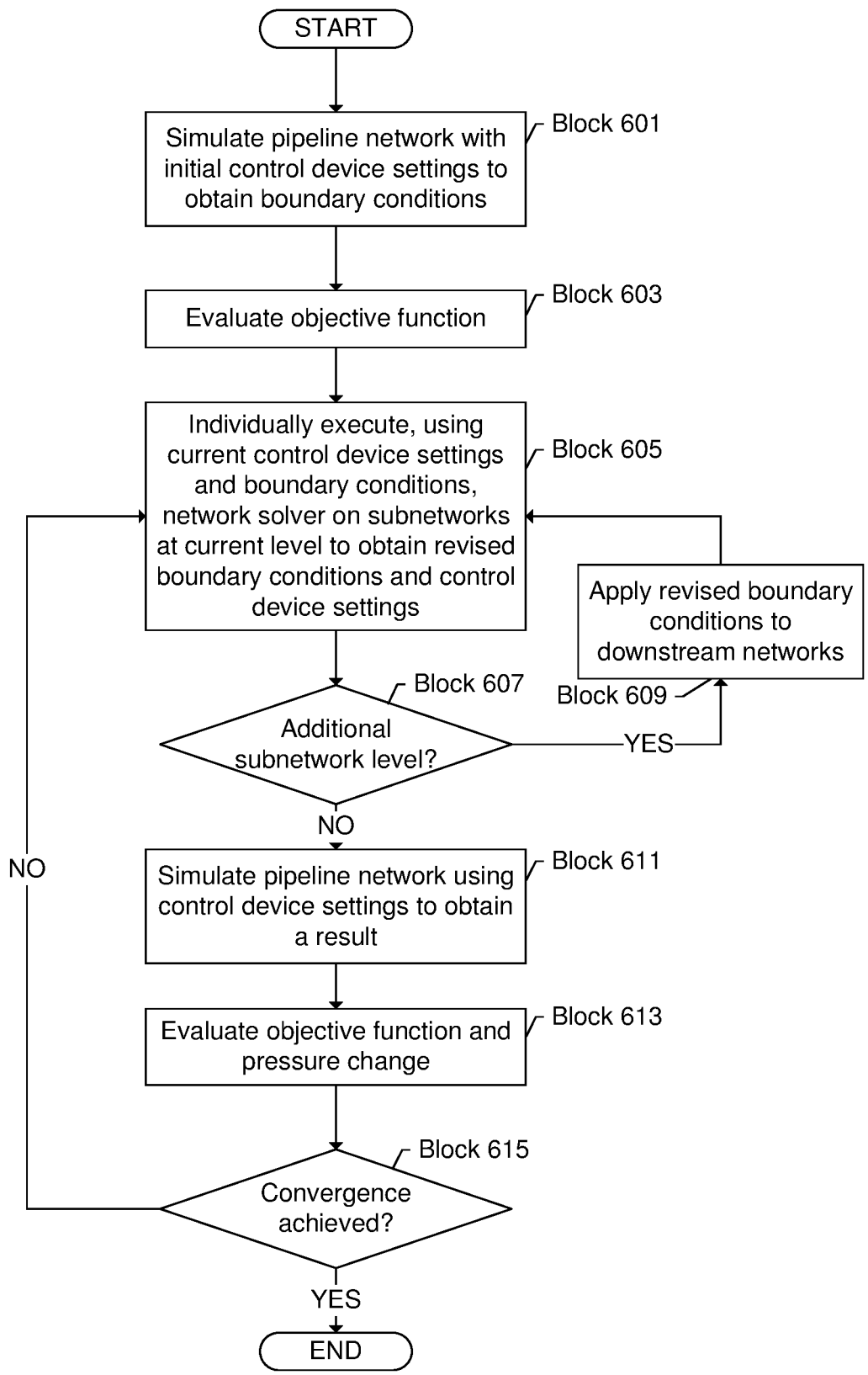
FIG. 6 shows a flowchart in accordance with one or more embodiments of the technology.

FIGS. 5 and 6 show flowcharts in accordance with one or more embodiments. While the various blocks in these flowchart are presented and described sequentially, one of ordinary skill will appreciate that some or all of the blocks may be executed in different orders, may be combined or omitted, and some or all of the blocks may be executed in parallel. Furthermore, the blocks may be performed actively or passively. For example, some blocks may be performed using polling or be interrupt driven in accordance with one or more embodiments of the technology. By way of an example, determination blocks may not require a processor to process an instruction unless an interrupt is received to signify that condition exists in accordance with one or more embodiments of the technology. As another example, determination blocks may be performed by performing a test, such as checking a data value to test whether the value is consistent with the tested condition in accordance with one or more embodiments of the technology.

Turning to FIG. 5, FIG. 5 shows a flowchart for performing one or more embodiments described herein. At Block 501, the network model is tuned based on observed values. Tuning the network model is an optional operation and may be performed to make the output of the network model more accurately represent the network. In general, the process of tuning is a regression analysis that reduces the residuals between the observed values and the simulated values. The process of tuning may be performed for the various nodes in the pipeline network.

Continuing with FIG. 5, a decomposed pipeline network that is decomposed into subnetworks is obtained at Block 503. Different techniques may be used to obtain a decomposed network. For example, the decomposed network may be provided to the computing system, the computing system may interact with a user to obtain boundary nodes, the computing system may automatically select boundary nodes, or a combination thereof. If the decomposed network is provided to the computing system, then the computing system may receive a list of nodes of the pipeline network that are boundary nodes via the web interface. The computing system may use the boundary nodes to create subnetworks.

As another example, the computing system may interact with a user to select the boundary nodes. In a GUI, a graph of the pipeline network is displayed to the user. The graph may show the particular control devices and location of the control devices. Via the GUI, an event of a user selection of a boundary node within the graph of the pipeline network is received. For example, the user may select a GUI widget that indicates that the user is selecting a particular node as the boundary node. The corresponding boundary node is marked as a boundary node and the process may repeat until the user stops selecting nodes for boundary nodes. At the boundary nodes selected by the user via the GUI, the pipeline network is decomposed into at least two subnetworks at the boundary node in response to the event of the selection.

Another example is for the automatic selection of boundary nodes. The pipeline network is traced to identify junctions. Nodes that are not control devices and are between junctions are determined by the computing system to be candidate nodes for boundary nodes. Based on a number of parallel processes assigned to the system (e.g., threads or processors), a number of subnetworks that may be on the same level is determined. Further, based on a comparison between compute times for each size of search space and cost in terms of overhead time (e.g., to send messages between subnetworks, etc.), a number of levels may be set. The size of the search space is the total number of combinations of control device settings for a subnetwork. The candidate nodes are selected as boundary nodes to equalize, within a tolerance, the distribution of the search space between the subnetworks.

Other methods may be used without departing from the scope of the claims to decompose the pipeline network into subnetworks.

Continuing with FIG. 5, at Block 505, initial control device settings of control devices in the pipeline network and initial boundary conditions are determined. If the pipeline network is an existing network, then the initial control device settings may be the current settings of the various control devices in the actual pipeline network. As another example, the initial control device settings may be an estimated setting. For example, user may provide initial control device settings, or the computing system may automatically select the initial control device settings. The initial boundary conditions may be obtained based on information about the pipeline network. For example, if the pipeline network is an existing advanced completion network, then the initial boundary conditions may be obtained directly from advanced completion components and other sensors in the network. As another example, one or more of the initial boundary conditions may be obtained from performing a network simulation of the whole pipeline network using the reservoir pressure, temperature, and other fluid properties as the boundary conditions of the source nodes of the whole pipeline network.

Further, although not shown in FIG. 5, a user may specify parameters of the optimization function. For example, the user may specify to maximize production, maximize profit, etc. The user may also provide parameters such as the current profit components for oil and gas, cost of water disposal, and other parameters used by the optimization function. The user may also specify additional constraints, such as a user defined maximum flowrate, or other values.

Using a current set of control device settings and boundary conditions, the network solver is individually executed on upstream subnetworks to obtain revised boundary conditions and control device settings at Block 507. For the first iteration, the current set of control device settings and boundary conditions are the initial values obtained in Block 505. For subsequent iterations, the current set is the computed values. The decomposed optimizer service initiates execution of the subnetwork solver containers on corresponding subnetworks. Specifically, the decomposed optimizer service provides the subnetwork solver containers optimization parameters, the portion of the pipeline model corresponding to the subnetwork, the current control device settings for control devices in the subnetwork, and the current boundary conditions in the subnetwork. The network solver within the subnetwork solver container executes independently of and in parallel with the network solvers in other subnetwork solver containers to obtain an optimal solution using the information provided by the decomposed optimizer service.

Specifically, the subnetwork optimizer service may repetitively perform the following. The subnetwork solver may send a set of control device settings to the network simulator service to obtain simulation results. The simulation results include boundary conditions and other fluid values for the subnetwork. Using the simulation results as input, the subnetwork optimizer service evaluates the objective function to obtain an evaluation result. The process repeats until the optimal solution is determined based on one or more thresholds. For example, a threshold may be convergence, whereby evaluation results are within a threshold to the current evaluation result. If the previous evaluation results are not within a threshold, then a new set of possible control device settings are selected. The process of selecting a new set of possible control device settings may be performed using various techniques to converge at the solution faster. Once the subnetwork optimizer service arrives at a determined optimal solution, the subnetwork optimizer service outputs the set of control device settings and boundary conditions in the optimal solution.

At Block 509, using current control device settings and boundary conditions of upstream subnetworks, the network solver on downstream subnetwork(s) are individually executed to obtain a result that includes revised boundary conditions and control device settings. The boundary conditions at the sink of the connected upstream subnetworks are the boundary conditions at the corresponding connected source node of the connected downstream subnetwork. Similar to Block 507, the decomposed optimizer service initiates execution of the subnetwork solver containers on corresponding downstream subnetwork(s). Specifically, the decomposed optimizer service provides the subnetwork solver containers optimization parameters, the portion of the pipeline model corresponding to the subnetwork, the current control device settings for control devices in the subnetwork, and the current boundary conditions in the subnetwork. The network solver within the subnetwork solver container executes independently of and in parallel with the network solvers in other subnetwork solver containers to obtain an optimal solution using the information provided by the decomposed optimizer service. The independent execution is the same as described above with reference to Block 507. Once the subnetwork optimizer service arrives at a determined optimal solution, the subnetwork optimizer service outputs the set of control device settings and boundary conditions in the optimal solution.

At Block 511, a determination may be made whether to continue. For example, the determination may be based on whether one or more thresholds are satisfied. Similar to subnetwork, the thresholds may be based on a test for convergence of the evaluation results. If a determination is made to continue, the process returns to Block 507 whereby the network is simulated using the control device settings from Blocks 507 and 509, and a new set of boundary conditions are set as the current boundary conditions. If a determination is made not to continue, the flow may proceed to Block 513. In Block 513, the result is presented. For example, the result may be stored, displayed in the GUI, sent to a connected program using an API, or otherwise presented. The set of control device settings in the result may be used to manually or automatically perform a field operation. Specifically, the various control devices may be set according to the corresponding control device setting of the control device.

FIG. 6 shows a more detailed flowchart of Blocks 505-511 in FIG. 5. Specifically, FIG. 6 shows an example of how Blocks 505-511 may be performed. At Block 601, the pipeline network is simulated with initial control device settings to obtain initial boundary conditions. Block 601 may be performed in a similar manner as described above in reference to Block 505 of FIG. 5. The network simulator service of the decomposition network solver container may simulate the pipeline network as a whole to obtain the boundary conditions. The decomposed optimizer service may associate the boundary conditions to corresponding nodes in the various subnetworks. At Block 603, the objective function is evaluated to obtain an initial evaluation result. The decomposed optimizer service may evaluate the objective function using the user parameters to calculate the initial evaluation result.

At Block 605, using the current control device settings and boundary conditions, the network solver is individually executed on subnetworks at current level to obtain revised boundary conditions and control device settings. Starting with the lowest level (i.e., subnetworks with sources that are not other subnetworks), the decomposed optimizer service initiates execution of the subnetworks at the current level to obtain boundary conditions and device settings for the current level. Once the boundary conditions and device settings for the current level are obtained, a determination is made whether another subnetwork level exists at Block 607. The next subnetwork level has subnetworks that are connected to the subnetworks at the current subnetwork level and downstream from the subnetworks at the current subnetwork level. If additional subnetwork levels exist, then the boundary conditions at the sink(s) of the current subnetwork level are applied as the boundary conditions at the source(s) of the next subnetwork level in Block 609. Thus, the next subnetwork level becomes the current subnetwork level and the process repeats with Block 605. If at least three subnetwork levels exist, the result of blocks 605-609 is iteratively individually executing the network solver on at least three levels of the subnetworks, whereby execution is in parallel on the same level.

If another subnetwork level does not exist, then the subnetwork solver containers have returned a set of control device settings for the various subnetworks of the decomposed pipeline network. The returned set of control device settings corresponds to a determined local optimal solution for the subnetworks. At Block 611, the network simulator service in the decomposition network solver container simulates the pipeline network using the returned set of control device settings to obtain a simulation result. At Block 613, the decomposed optimizer service evaluates the objective function with the simulation result and pressure change to obtain an evaluation result. At Block 615, a determination is made whether the evaluation result achieves convergence. Determining whether the evaluation result achieves convergence may be performed as described above with reference to Block 511 of FIG. 5. If convergence is not achieved, the process may repeat with Block 605 of FIG. 6. When the process repeats, the current boundary conditions are the boundary conditions output by the network simulator service in Block 611. The current control device settings are the control device settings used to simulate the network in Block 611 in one or more embodiments. Thus, the process may repeat for another round of determining an optimal for a network.

FIGS. 7.1, 7.2, 7.3, and 7.4 show an example diagram in accordance with one or more embodiments. The following example is for explanatory purposes only and not intended to limit the scope of the technology.

Firstly, consider the network model (700) shown in FIG. 7.1. FIG. 7.1 represents 2 wells, each with 2 producing zones. The fluids from the wells are connected to a manifold (J-13 (702)) via branches B-15 (704) and B-16 (706). The combined fluids flow through branch B-17 (708) to the downstream collection sink. The boundary conditions at the producing zones and the sink are pressure specified, indicated by the 'P' in the figure. In addition, particular fluid properties are assigned to each source node indicative of the fluids gathered from the reservoir at the given producing zone. Also, each branch connecting the reservoir to the completion (B-1 (710), B-8 (712), B-20 (714) and B-21 (716)) includes a flow control valve. The flow control valve may be tuned to control the flow of fluids into the completion from each section. The tubing in the vertical risers (branches B-13 (718) and B-18 (720)) include a gas-lift valve each. Gas is injected at high pressure though the gas lift valves into the wellbore to assist the production of fluid to the surface. As the available lift-gas is often limited, an optimal allocation is used to maximize the production value at the sink (722).

A network solution entails establishing the flowrates through each branch and the pressures at the internal nodes in the system. For a simple network such as shown, a network solution is not too demanding. However, for a large-scale system the computation and time cost can be significant. To determine the control device settings for the gas-lift rates and the choke settings in order to maximize the production value at the sink (722), many simulation evaluations may be used depending on the total number of control variables in the problem. With respect to the complexity of solving and optimizing a large-scale problem, one with hundreds of wells, each with multiple laterals with many producing zones, where each producing zone comprises a flow control valve and each well comprises an artificial lift mechanism (such as gas-lift or ESP) and also a wellhead choke, the embodiments describe above may achieve performance metrics so as to be possible on a computing device.

The purpose of the decomposition scheme is creating a number of smaller network models. This serves two particular purposes. Firstly, each sub-network model is much faster and easier to solve since the subnetwork will result in a smaller network model with fewer branches. This means that the model will be more stable and quicker to solve. Secondly, a number of sub-optimization problems can be defined and solved over each subnetwork model. As each subnetwork is smaller, with fewer control variables as compared to the entire network, the solution of the subnetwork optimization problem is easier and more readily achieved. Moreover, the optimization problem of certain subnetworks may reduce to known procedures that are highly e ective for that particular problem type. For example, a network model with gas-lift valves only, leads to the gas-lift optimization (GLO) problem.

Each partition will occur at a selected boundary node (724, 726) that subsequently will appear as both a source and sink in the resulting sub-networks. That is, in the downstream portion, the boundary node will appear as a source and in the upstream section, the boundary node will appear as a sink. The partition locations for the example network are shown in FIG. 7.1. This results in three sub-networks. The upper section includes the wells, referred to as Sub-Net1

(SN1) model (750), is shown in FIG. 7.2. The lower sections for each well are referred to as Sub-Net2A (SN2A) and Sub-Net2B (SN2B), respectively. Sub-Net2A model (760) is shown in FIG. 7.3. Sub-Net2B model (770) is shown in FIG. 7.4. The models are similar to the example schematic diagram described above with reference to FIGS. 2 and 3.

To determine an optimal solution for the example shown in FIGS. 7.1-7.4, the operations of TABLE 1 below may be performed in a loop until convergence is achieved.

TABLE 1

| Operation 1 Run EN for validation | |
|---|---|
| Set current Choke settings (in EN) | $C_{11}, C_{12}, C_{21}$ & $C_{22}$ |
| Set current GLIR settings (in EN) | $L_1$ & $L_2$ |
| Solve EN | branches B-6 & B-12 |
| Get sink results and establish F (M$) | |
| Get (P, T) data at each partition node | |

| Operation 2 Convergence Tests | |
|---|---|
| Evaluate rmse = f (P ,$P_{old}$) | where P = [$P_6$ $P_{12}$] |
| Evaluate dF = abs( F(EN) F(EN)$_{old}$) | change in F |
| If dF ≤ $f_{eps}$ stop | |
| If rmse ≤ eps stop | |
| If k > $k_{max}$ stop | |

| Operation 3 Optimize each SN2 (Choke settings) | |
|---|---|
| set sink boundary(SN2, $P_{BC}$, $T_{BC}$) | BC established from EN |
| optimize(SN2, XLB, XUB) for $X_{opt}$ get | Choke settings $C_{ij}$ and F(SN2) Fluid properties at $X_{opt}$ |
| fluid properties(SN2, $X_{opt}$) | |

| Operation 4 Optimize SN1 (Gas-lift settings) | |
|---|---|
| For each source node, specify fluid props as BC: | |
| Fluid(Watercut) | SN2(Watercut) |
| Fluid(GLR SI) | SN2(GLR SI) |
| Fluid(GasSG) | SN2(GasSG) |
| Fluid(WaterSG) | SN2(WaterSG) |
| Fluid(API) | SN2(API) |
| Set fluid properties(Fluid) as BC | set SN2 fluid as BC |
| Set($P_{BC}$, $T_{BC}$) | set partition node P ,T as BC |
| Optimize(SN1, XLB, XUB) | F(SN1), $L_1$ & $L_2$, |

| Operation5 Iteration Summary | |
|---|---|
| Iteration number | k |
| Control variables | $C_{11}, C_{12}, C_{21}, C_{22}, L_1$ & $L_2$ $P_6, P_{12}$ |
| Partition pressure | |
| SN objective value | F(SN2A), F(SN2B), F(SN1) |
| EN objective | F(EN) |
| Error measures | RMSE, dF |

The result of performing the operations described above is to determine the Optimal: $C_{11}$, $C_{12}$, $C_{21}$, $C_{22}$, $L_1$, $L_2$, F(EN), F(SN1), F(SN2), which is then returned.

In Operation 1, the entire pipeline network model (EN) is evaluated with the current control variable settings to establish the production value at the sink. The pressure and temperature data at each boundary node is also extracted.

In Operation 2, two error measures are evaluated. One concerns the root mean square error of the pressure vector of the boundary nodes. The second concerns the change in the best objective value over two consecutive iterations. If the convergence conditions are not met, as prescribed by the algorithm parameters (eps, $f_{eps}$, $k_{max}$), the procedure continues.

In Operation 3, firstly, for each sub-network, the P and T information from the associated partition node in the EN is set as the sink BC. Subsequently, each sub-network (SN2) is optimized for the choke settings that result in the best production value at the sink. These optimization problems are independent and can be evaluated in parallel, yielding the best choke settings, the SN2 objective values and the sink fluid properties at the optimal conditions. In eect, the optimal fluid is established at the sink of each sub-network by suitably tuning the choke settings. The fluid definition can be simple black-oil or detailed by composition.

In Operation 4, the fluid properties at optimal conditions from each sub-network SN2 are specified as the fluid properties in the respective source node in SN1. That is, each well describes the best fluid that optimizes the values from the associated sub-network SN2. In addition to the fluid properties, the P and T values that mark the anchor points for each sub-network are also specified in the appropriate source nodes (as established in Operation 1). Subsequently, the sub-network SN1 is optimized for the gas-lift rates in each tubing section in order to maximize the production value at the sink. That is, the best fluids in each well are lifted using gas injection to maximize the collective production value of all fluids received at the sink (subject to constraints such as lift-gas availability; $L_1+L_2 \leq C$).

The iteration summary is provided in Operation 5. This includes the control variables, objective function values, partition node pressures and the error measure associated with the best known solution. The procedure then returns to Operation 1. In Operation 1, the collective set of control variables is applied to establish the updated pressures at the specified partition nodes. For this reason, the primary convergence test is a norm on the mis-match on the partition node pressures over consecutive iterations. The afore-described process repeats until the convergence or stopping conditions are met.

The decomposition scheme is intended to reduce a large-scale problem comprising many hundreds of variables, all of mixed variety, to one comprising a number of smaller sub-networks, each presenting a more tractable optimization problem. Clearly, the solution of sub-networks SN2 can be achieved in parallel, and collectively, the larger network problem can be solved in a few number of iterations, in contrast to running one large network model many hundreds of times.

Figure 8:
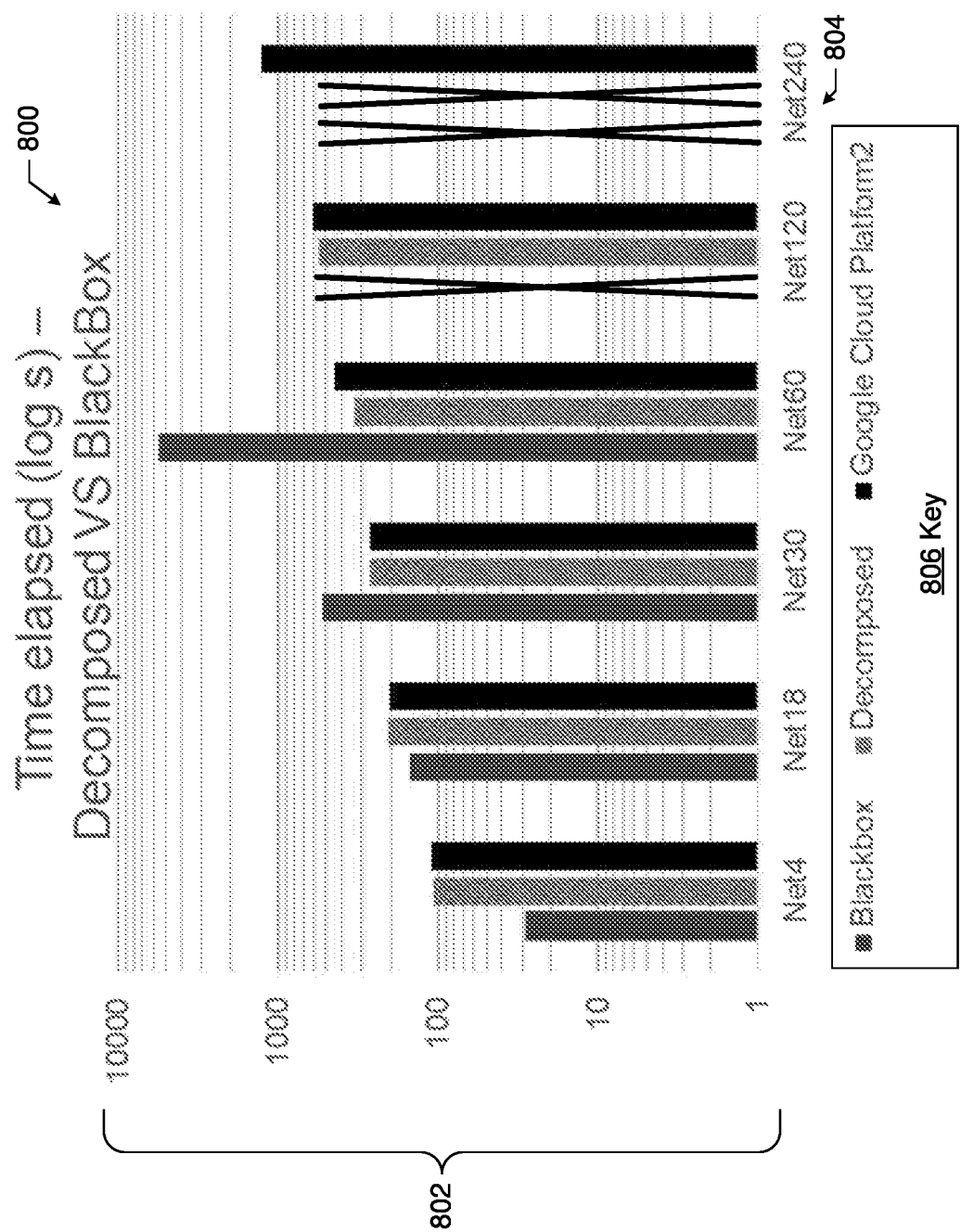
FIG. 8 shows an example performance diagram in accordance with one or more embodiments of the technology.

Turning to FIG. 8, FIG. 8 illustrates an example performance graph (800) of different executions. The vertical axis (802) shows time on a logarithmic scale while the horizontal axis (804) shows the different size of optimization problems based on the number of control devices. In key (806), the blackbox is the general serial optimization in which the entire pipeline network is optimized at once. Decomposed is the optimization performed according to one or more embodiments disclosed herein. Google Cloud Platform2 show the optimization according to one or more embodiments disclosed herein on the GOOGLE CLOUD PLATFORM™ Service. (GOOGLE CLOUD PLATFORM™ Service is a trademark of Google, Inc. Located in Mountain View, California). In the performance graph (800), the X denotes that the size of the optimization problem was infeasible to solve using the computing system configuration denoted by the key (806). Thus, the blackbox approach could not solve the optimization problem of 120 or 240 control devices. A large computing cluster is used to solve the optimization problem having 240 control devices using the techniques presented herein.

The independence of the subnetwork optimization provides an opportunity for parallel computing with linear scaling that is well suited for distributed computing patterns on cloud infrastructure. A unique distributed approach is developed for the computation of the decomposed network simulation optimization. Using this technique, the computation on compute clusters can scale up to any problem size and the solution times evolve linearly compared to the exponential solve times experienced with traditional, sequential optimization methods.

Table 2 presents a set of symbols that may appear in the present application.

TABLE 2

| Symbol | Description |
|---|---|
| B-i | branch with index I |
| cw | water cost $ per barrel |
| C | available lift gas limit |
| C | choke reading (inch) |
| Cij | choke setting in well i zone j |
| dp | normalized pressure change |
| dt | normalized temperature change |
| dF | change in production value |
| eps | pressure norm convergence tolerance |
| feps | change in functional value tolerance |
| F | production value merit function (M$) |
| F(NET) | production value for NET model |
| F(NET)old | production value for NET model at previous iteration |
| i | generic counter |
| j | generic counter |
| J-k | junction with index k |
| k | generic counter or iteration |
| kmax | maximum iterations |
| Lk | gas-lift rate in well k |
| P | network model pressure specification |
| po | oil price $ per barrel |
| Pg | gas price $ per MMscfd |
| P | pressure |
| Pin | inlet pressure |
| Pout | outlet pressure |
| Pobs | observed pressure |
| Psim | simulated pressure |
| PBC | pressure as boundary condition |
| Pk | pressure at node k |
| P | pressure reading (psia) |
| P | pressure vector |
| Pold | pressure vector at last iteration |
| Pobs | observed pressure vector |
| Psim | simulated pressure vector |
| Qoil | oil rate (STB) |
| Qwat | water rate (STB) |
| Qgas | gas rate (mmscfd) |
| Q | flowrate reading (STB) |
| R | residual function |
| T | temperature reading |
| T | temperature |
| Tin | inlet temperature |
| Tout | outlet temperature |
| Tobs | observed temperature |
| Tsim | simulated temperature |
| TBC | temperature as boundary condition |
| T | temperature vector |
| Tobs | observed temperature vector |
| Tsim | simulated temperature vector |
| W | water-cut reading (fraction) |
| X | control variable array |
| Xopt | optimal control variable set |

Embodiments of the technology may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9.1, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities that implement the features and elements of the disclosure.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (900) in FIG. 9.1 may be connected to or be a part of a network. For example, as shown in FIG. 9.2, the network (920) may include multiple nodes (e.g., node X (922), node Y (924)). Each node may correspond to a computing system, such as the computing system shown in FIG. 9.1, or a group of nodes combined may correspond to the computing system shown in FIG. 9.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (900) may be located at a remote location and connected to the other elements over a network.

Although not shown in FIG. 9.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9.1. Further, the client device (926) may include and/or perform all or a portion of one or more embodiments of the technology.

The computing system or group of computing systems described in FIGS. 9.1 and 9.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 9.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9.1, while performing one or more embodiments of the technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A–B), and the status flags may be read to determine if the result is positive (i.e., if A>B, then A–B>0). In one or more embodiments, B may be considered a threshold, and A is deemed to satisfy the threshold if A=B or if A>B, as determined using the ALU. In one or more embodiments of the technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 9.1 and the nodes and/or client device in FIG. 9.2. Other functions may be performed using one or more embodiments of the technology.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method comprising:
displaying, in a graphical user interface of a computing system, a graph of a pipeline network;
receiving, via the graphical user interface of the computing system, an event of a user selection of a boundary node within the graph of the pipeline network, the event triggered by a graphical user interface widget within the graphical user interface;
decomposing, by the computer system, the pipeline network into a plurality of subnetworks at the boundary node in response to the event, the plurality of subnetworks comprising a plurality of upstream subnetworks and a downstream subnetwork;
individually executing, by the computing system, and using a first set of control device settings and a first set of boundary conditions, a network solver on the plurality of upstream subnetworks in parallel to obtain a second set of boundary conditions and a second set of control device settings;
executing, by the computing system and using the second set of boundary conditions, the network solver on the downstream subnetwork to obtain a result comprising a third set of control device settings;
testing, by the computing system, whether the result satisfies a threshold; and
presenting, by the computing system, the third set of control device settings based on the result satisfying the threshold.

2. The method of claim 1, wherein the executing the network solver for the subnetwork comprises:
executing a plurality of simulations using a pipeline network model to obtain a plurality of simulation results; and
evaluating, for each simulation result of the plurality of simulation results, an objective function on the simulation result.

3. The method of claim 2, further comprising:
tuning, prior to executing the network solver, the pipeline network model based on a comparison of actual values obtained by a plurality of sensors in the pipeline network with simulated values obtained from simulating the pipeline network model.

4. The method of claim 3, wherein the tuning is performed using a regression analysis model of residuals of the pipeline network model.

5. The method of claim 1, further comprising:
iteratively individually executing the network solver on at least three levels of the plurality of subnetworks to obtain the result.

6. The method of claim 1, further comprising:
prior to executing the network solver on the plurality of upstream subnetworks in parallel, executing a network simulator service on the pipeline network using an initial set of control device settings to obtain the first set of boundary conditions.

7. The method of claim 1, further comprising:
after executing the network solver on the downstream subnetwork, executing a network simulator service using the second set of control device settings and the third set of control device settings to obtain a simulation result;
evaluating an objective function on the simulation result to obtain an evaluation result; and
testing for convergence of the evaluation result.

8. The method of claim 1, wherein the second set of boundary conditions comprises pressure and temperature values.

9. A computing system comprising:
a plurality of computing system resources;
a web service including a graphical user interface and configured to:
display, in the graphical user interface, a graph of a pipeline network,
receive, via the graphical user interface, an event of a user selection of a boundary node within the graph of the pipeline network, the event triggered by a graphical user interface widget within the graphical user interface, and
decompose the pipeline network into a plurality of subnetworks at the boundary node in response to the event, the plurality of subnetworks comprising a plurality of upstream subnetworks and a downstream subnetwork;
a plurality of subnetwork solver containers, each allocated a subset of the plurality of computing system resources, for:
individually executing, using a first set of control device settings and a first set of boundary conditions, a network solver on the plurality of upstream subnetworks in parallel to obtain a second set of boundary conditions and a second set of control device settings, and
executing, using the second set of boundary conditions, the network solver on the downstream subnetwork to obtain a result comprising a third set of control device settings; and
a decomposition network solver container executing on the plurality of computing system resources for:
testing for whether the result satisfies a threshold, and
presenting the third set of control device settings based on the result satisfying the threshold.

10. The computing system of claim 9, further comprising:
a messaging system configured to pass messages among the plurality of subnetwork solver containers and the decomposition network solver container.

11. The computing system of claim 9, wherein the plurality of subnetwork solver containers each comprises an optimizer service and a network simulator service.

12. A non-transitory computer readable medium comprising computer readable program code for performing operations, the operations comprising:
displaying, in a graphical user interface, a graph of a pipeline network;
receiving, via the graphical user interface, an event of a user selection of a boundary node within the graph of the pipeline network, the event triggered by a graphical user interface widget within the graphical user interface;
decomposing the pipeline network into a plurality of subnetworks at the boundary node in response to the event, the plurality of subnetworks comprising a plurality of upstream subnetworks and a downstream subnetwork;
individually executing, using a first set of control device settings and first set of boundary conditions, a network solver on the plurality of upstream subnetworks in parallel to obtain a second set of boundary conditions and a second set of control device settings;

executing, using the second set of boundary conditions, the network solver on the downstream subnetwork to obtain a result comprising a third set of control device settings;

testing whether the result satisfies a threshold; and presenting the third set of control device settings based on the result satisfying the threshold.

13. The non-transitory computer readable medium of claim 12, the operations further comprising:

iteratively individually executing the network solver on at least three levels of the plurality of subnetworks to obtain the result.

14. The non-transitory computer readable medium of claim 12, the operations further comprising:

prior to executing the network solver on the plurality of upstream subnetworks in parallel, executing a network simulator service on the pipeline network using an initial set of control device settings to obtain the first set of boundary conditions.

15. The non-transitory computer readable medium of claim 12, the operations further comprising:

after executing the network solver on the downstream subnetwork, executing a network simulator service using the second set of control device settings and the third set of control device settings to obtain a simulation result;

evaluating an objective function on the simulation result to obtain an evaluation result; and testing for convergence of the evaluation result.

16. The non-transitory computer readable medium of claim 12, wherein the second set of boundary conditions comprises pressure and temperature values.

* * * * *